US009921738B2

United States Patent
Kim et al.

(10) Patent No.: US 9,921,738 B2
(45) Date of Patent: Mar. 20, 2018

(54) APPARATUS AND METHOD FOR PROCESSING DISPLAYED INFORMATION IN PORTABLE TERMINAL

(71) Applicant: Samsung Electronics Co., Ltd., Suwon-si, Gyeonggi-do (KR)

(72) Inventors: Heejin Kim, Seoul (KR); Sihak Jang, Yongin-si (KR); Sanghyuk Koh, Jeju-si (KR); Bohyun Sim, Incheon (KR); Hyemi Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/326,840

(22) Filed: Jul. 9, 2014

(65) Prior Publication Data
US 2015/0015604 A1    Jan. 15, 2015

(30) Foreign Application Priority Data

Jul. 9, 2013  (KR) .................. 10-2013-0080003

(51) Int. Cl.
| | |
|---|---|
| *G09G 5/00* | (2006.01) |
| *G06F 3/0484* | (2013.01) |
| *G06F 3/0488* | (2013.01) |
| *G06T 7/00* | (2017.01) |
| *G06F 3/0481* | (2013.01) |
| *G06T 11/60* | (2006.01) |
| *G06F 9/54* | (2006.01) |
| *G06F 3/041* | (2006.01) |
| *G06T 5/00* | (2006.01) |
| *G06Q 10/10* | (2012.01) |

(52) U.S. Cl.
CPC .......... *G06F 3/0488* (2013.01); *G06F 3/0416* (2013.01); *G06F 3/0481* (2013.01); *G06F 3/04842* (2013.01); *G06F 3/04883* (2013.01); *G06F 9/543* (2013.01); *G06T 5/005* (2013.01); *G06T 11/60* (2013.01); *G06Q 10/109* (2013.01)

(58) Field of Classification Search
CPC .... G06F 9/543; G06F 3/04882; G06F 3/0488; G06F 3/0416; G06F 3/04883; G06F 3/0481; G06T 11/60; G06T 5/005
USPC ....... 345/626, 173, 620, 621, 622, 623, 624, 345/625, 627, 676
See application file for complete search history.

(56) References Cited

U.S. PATENT DOCUMENTS

| | | | | |
|---|---|---|---|---|
| 6,002,401 | A * | 12/1999 | Baker | G06F 17/30067 345/473 |
| 6,735,347 | B1 * | 5/2004 | Bates | G06F 17/24 358/405 |
| 6,848,082 | B1 * | 1/2005 | Patel | G06T 19/003 715/781 |
| 9,007,405 | B1 * | 4/2015 | Eldar | G09G 5/02 345/666 |
| 2007/0022386 | A1 * | 1/2007 | Boss | G06F 9/543 715/764 |
| 2009/0320052 | A1 * | 12/2009 | Crucs | G06F 17/212 719/329 |

(Continued)

*Primary Examiner* — Jin-Cheng Wang
(74) *Attorney, Agent, or Firm* — Jefferson IP Law, LLP

(57) ABSTRACT

A method for processing information in a portable terminal is provided. The method includes displaying a content, displaying a clip area on the content when detecting a clip touch interaction, correcting the clip area by analyzing a pattern and/or information of the clip area, and storing information of corrected clip area in a clipboard.

18 Claims, 16 Drawing Sheets

<440>

<450>

(56) References Cited

U.S. PATENT DOCUMENTS

| | | | |
|---|---|---|---|
| 2010/0042933 A1* | 2/2010 | Ragusa | G06F 3/0481 715/760 |
| 2010/0251189 A1* | 9/2010 | Jaeger | G06F 3/0481 715/863 |
| 2011/0072344 A1* | 3/2011 | Harris | G06F 3/04817 715/702 |
| 2012/0092268 A1* | 4/2012 | Tsai | G06F 17/24 345/173 |
| 2012/0302167 A1* | 11/2012 | Yun | G06F 3/04883 455/41.2 |
| 2013/0014041 A1* | 1/2013 | Jaeger | G06F 3/0481 715/765 |
| 2013/0117658 A1* | 5/2013 | Fidler | G06F 17/3061 715/234 |
| 2013/0232408 A1* | 9/2013 | Xu | G06F 3/0486 715/256 |
| 2013/0272579 A1* | 10/2013 | Burry | G06K 9/3258 382/105 |
| 2013/0321313 A1* | 12/2013 | Huang | G06F 3/041 345/173 |
| 2014/0013258 A1* | 1/2014 | Jang | G06F 3/0488 715/770 |

* cited by examiner

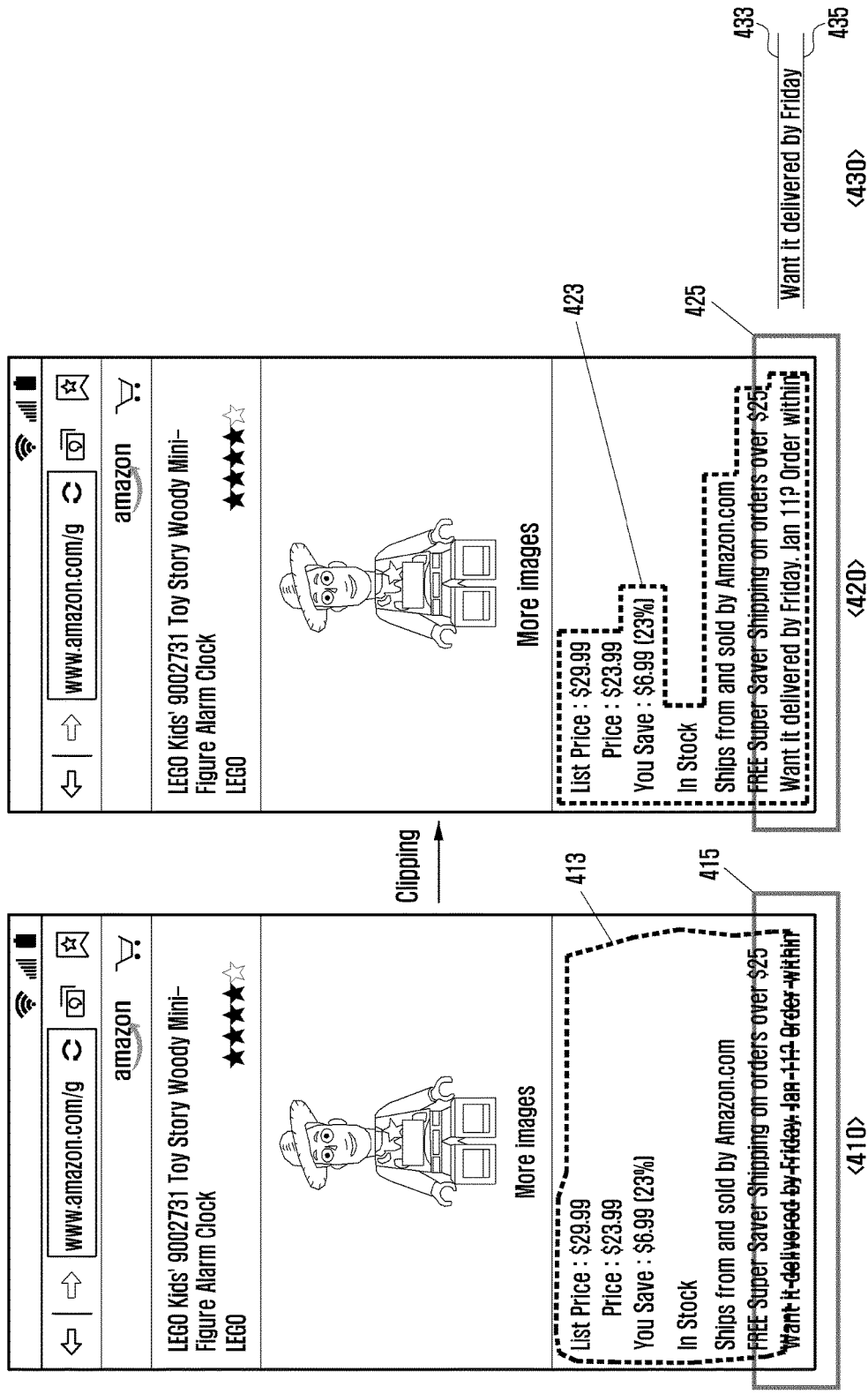

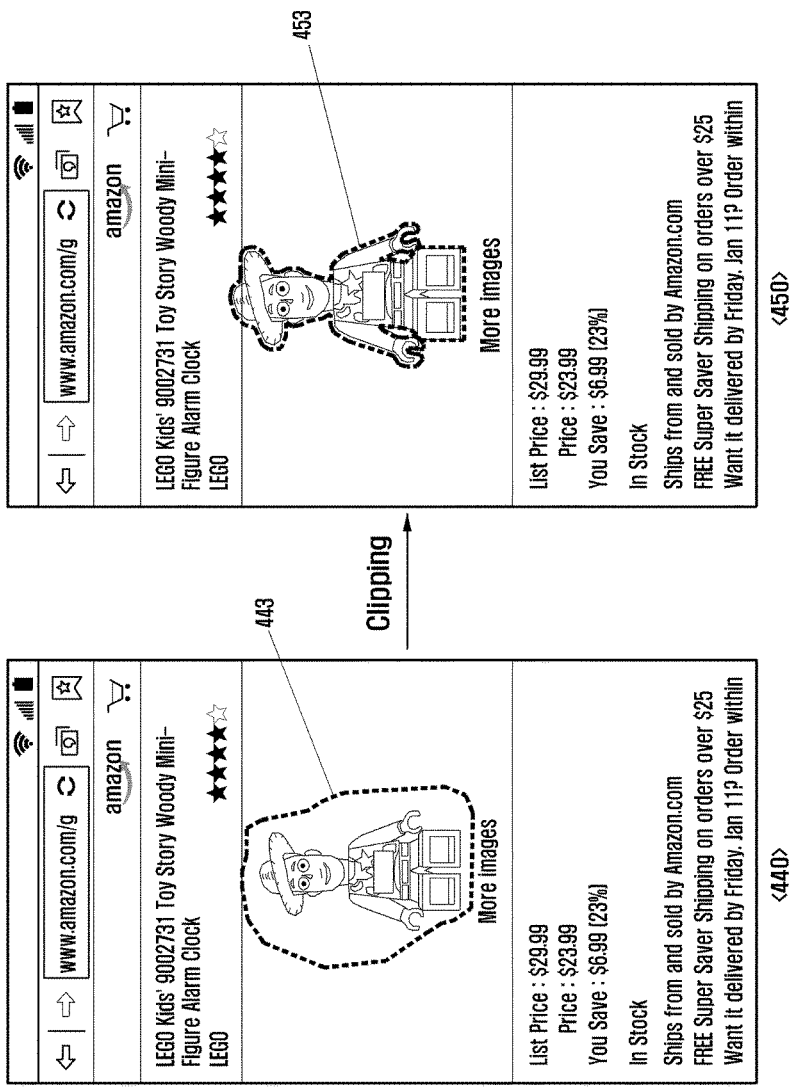

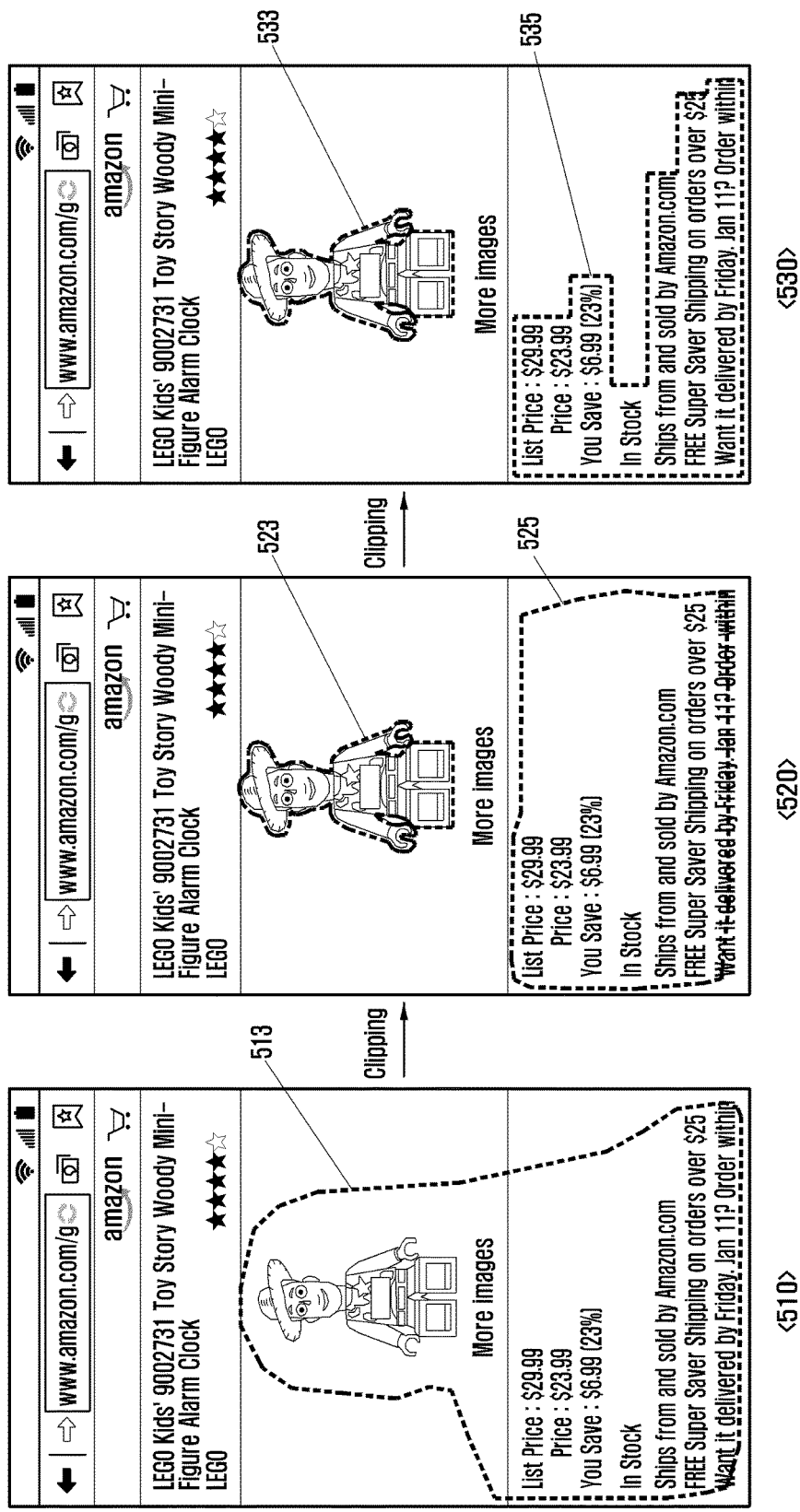

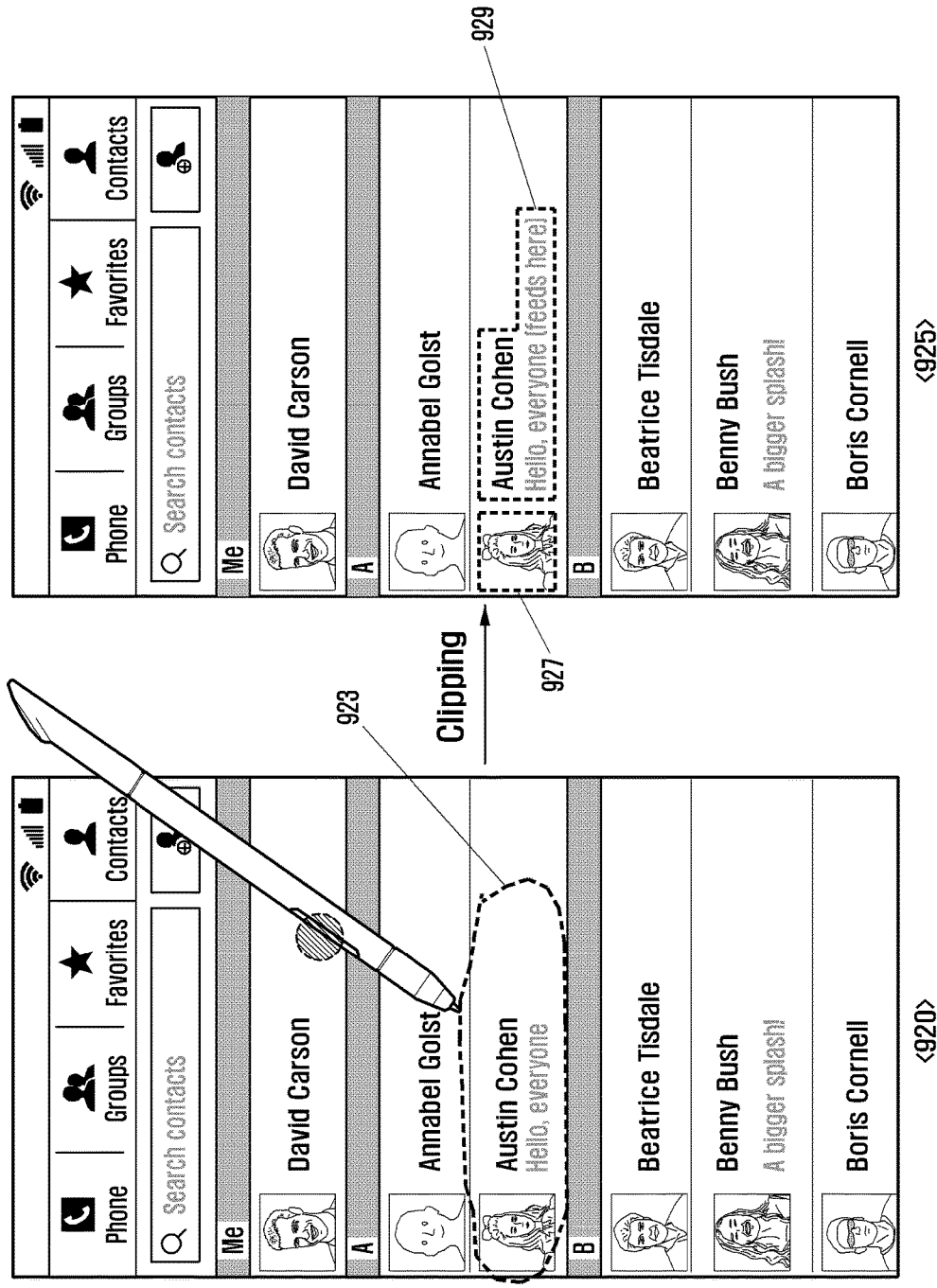

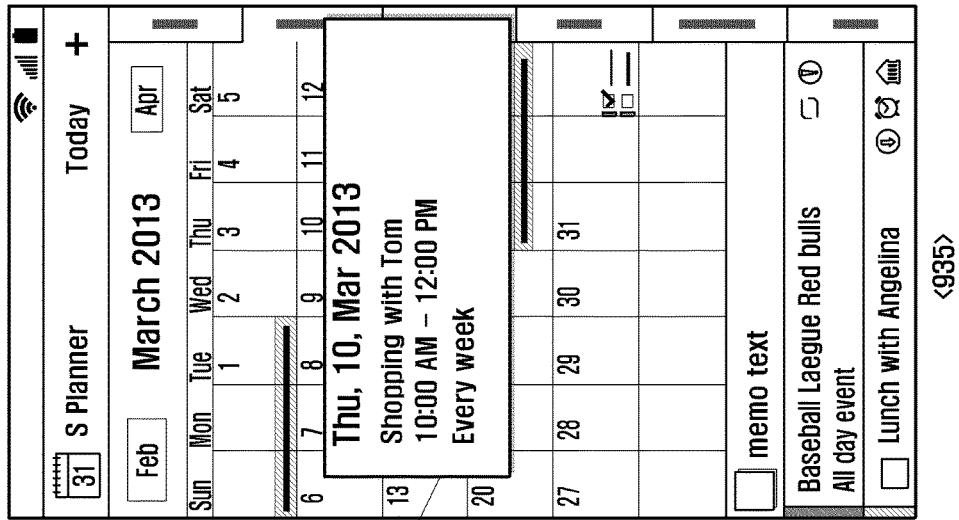
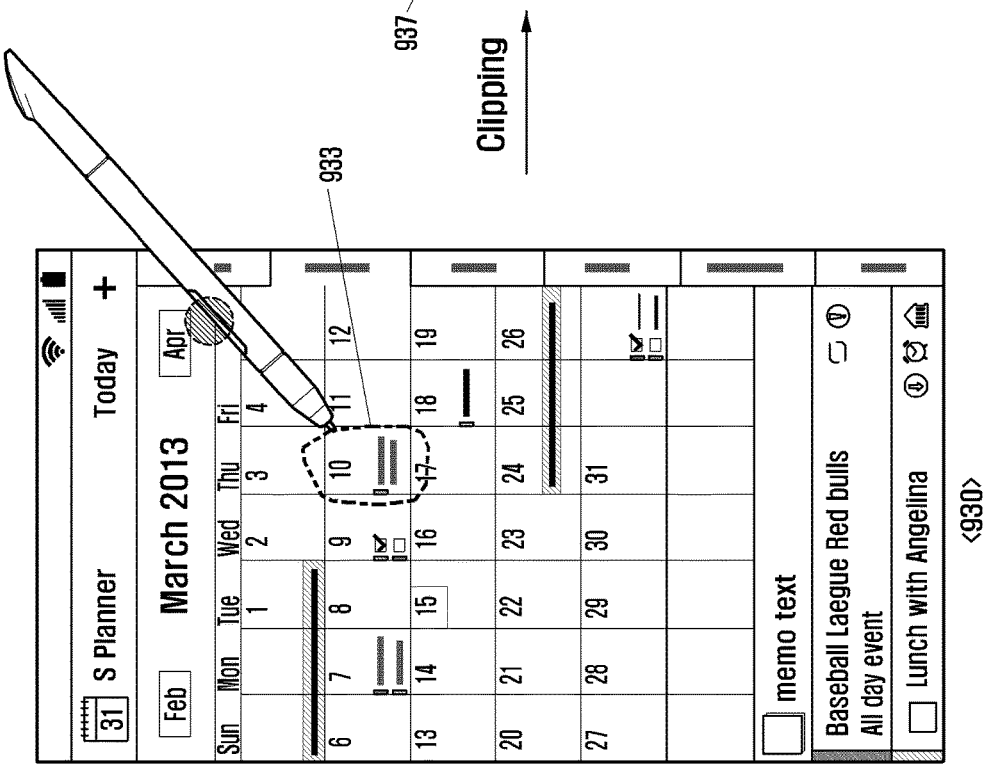
FIG. 9C

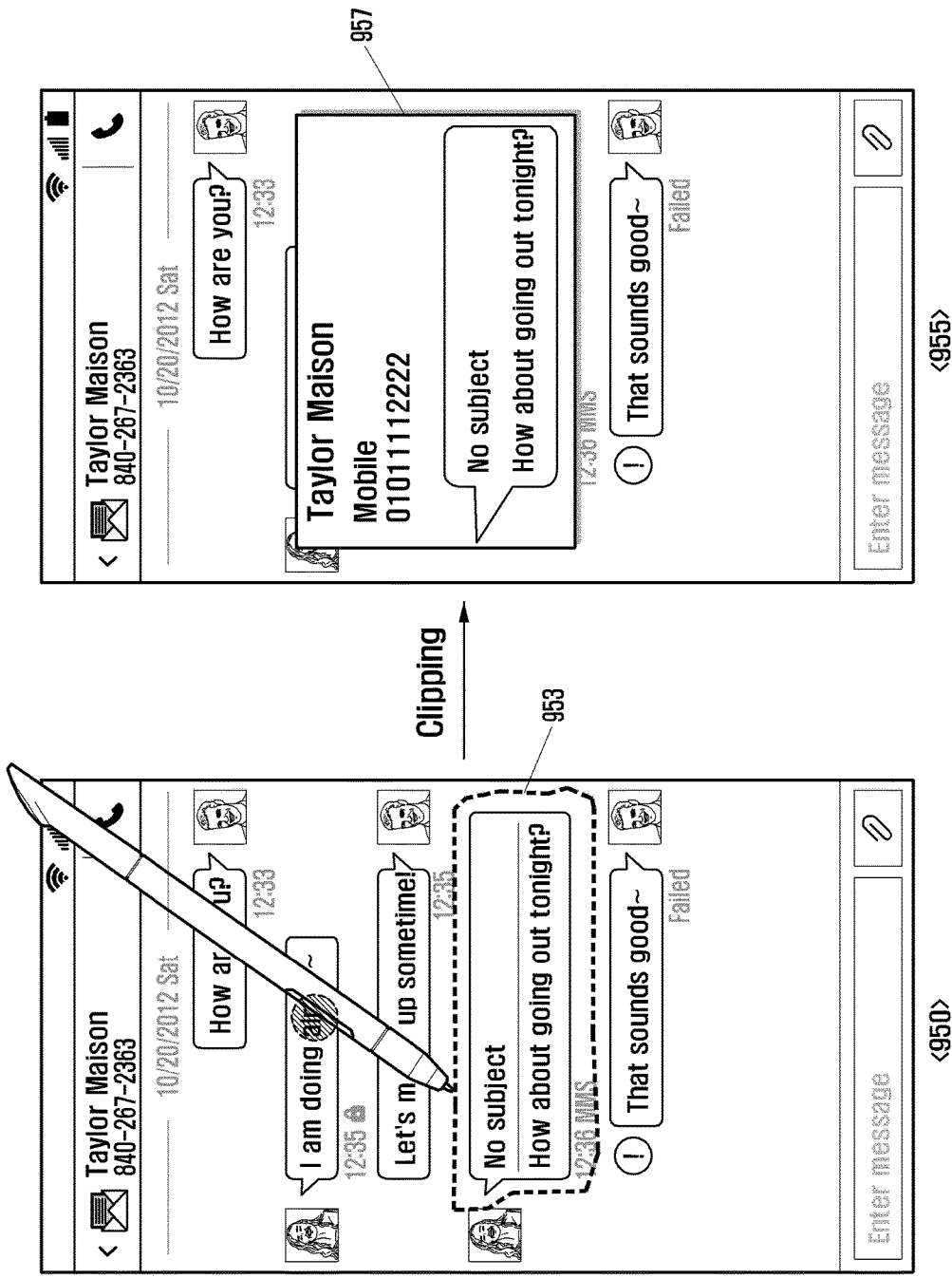

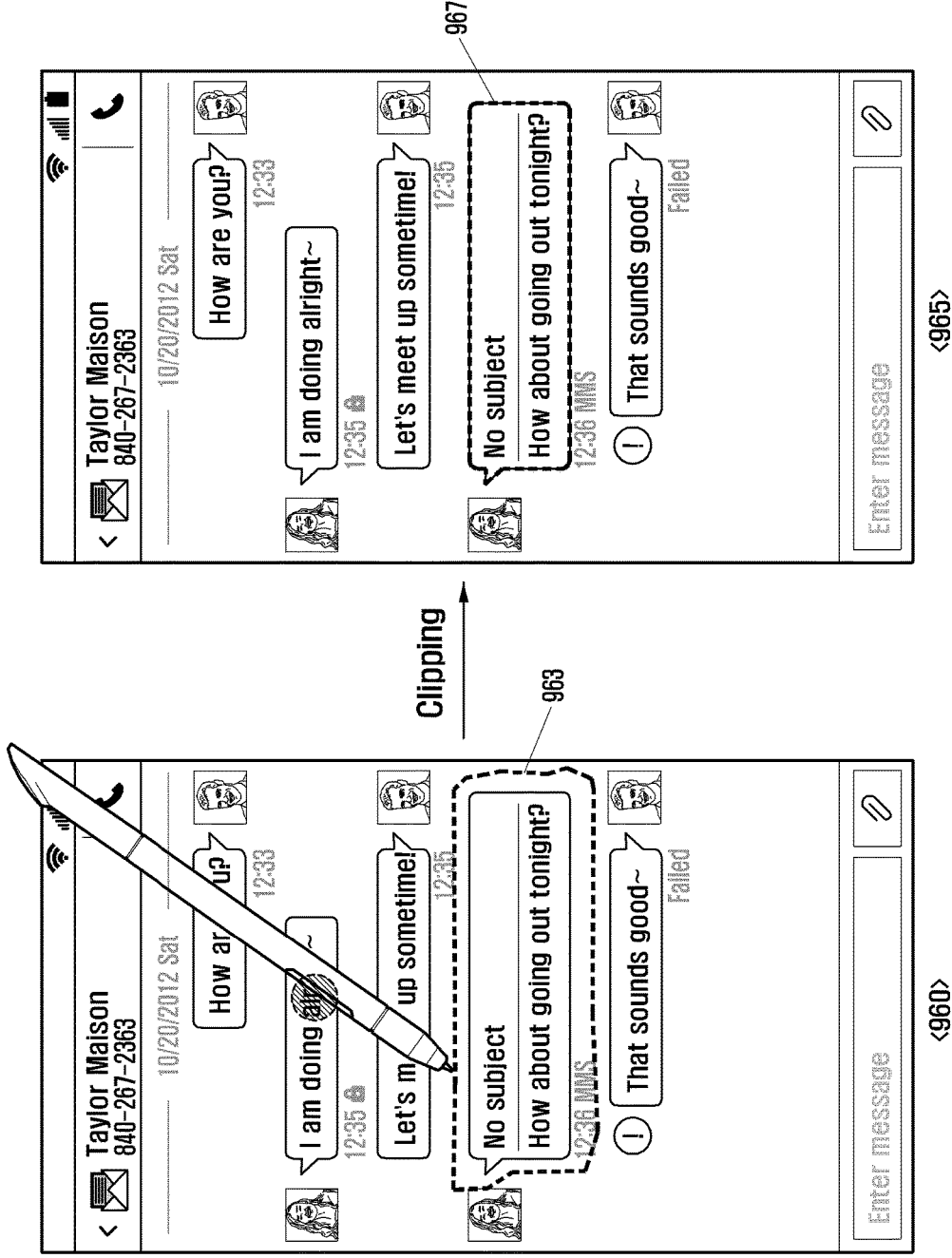

APPARATUS AND METHOD FOR PROCESSING DISPLAYED INFORMATION IN PORTABLE TERMINAL

CROSS-REFERENCE TO RELATED APPLICATION(S)

This application claims the benefit under 35 U.S.C. § 119(a) of a Korean patent application filed on Jul. 9, 2013 in the Korean Intellectual Property Office and assigned Serial number 10-2013-0080003, the entire disclosure of which is hereby incorporated by reference.

TECHNICAL FIELD

The present disclosure relates to an apparatus and a method for processing information in a portable terminal. More particularly, the present disclosure relates to an apparatus and a method for processing displayed information by clipping information.

BACKGROUND

A portable terminal may display various kinds of information, and process information with various forms according to a user selection. A method for clipping information and storing the clipped information in a clipboard to process is one of those information processing methods of the portable terminal. Here, the term "clip" refers to select part or all of the displayed information in order to refer or store, and the "clipboard" refers to a memory area secured to use as an area for temporarily storing clipped information in the portable terminal.

In the method of the related art of generating clip information in the portable terminal, a target selected by a pen is clipped as an image type regardless of a text and an image. In addition, a pen drawing is formed depending on a shape of drawing performed by a user. For example, when the user clips the image, the clipping is dependent on the pen drawing. Thus, the clip cannot be performed depending on the image shape or the paragraph shape of the text, and the clip is performed in the pattern of a curved shape. Therefore, the clip cannot be performed in standard shapes. In addition, if the image or the text is overlapped with the boundary of the pen drawing, a corresponding image and/or text may not be clipped. Further, when the image and text are selected simultaneously by the pen drawing, two attributes are bound together to perform the clip by imaging, such that the clip cannot be performed individually. Thus, two operations were required in order to clip the image and text individually.

Therefore, a need exists for an apparatus and a method for clipping and processing information by correcting a clip area according to a clip pattern and/or information of the clip area when clipping the information in a portable terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for clipping and processing information by correcting a clip area according to a clip pattern and/or information of the clip area when clipping the information in a portable terminal.

To this end, the present disclosure may provide an apparatus and a method capable of correcting an area for clipping information in a pattern of minute and standardized figure according to a clip pattern (e.g., a pen drawing) when clipping the information in a portable terminal.

Another aspect of the present disclosure is to provide an apparatus and a method capable of clipping information according to a curved shape of information of a clip area by analyzing the information of the clip area when clipping the information in a portable terminal.

Another aspect of the present disclosure is to provide an apparatus and a method capable of correcting a clip area to include a boundary text/image when the text/image is overlapped with a boundary of the clip area.

Another aspect of the present disclosure is to provide an apparatus and a method capable of clipping information by separating a text and an image according to attribute of information when the clip area includes the text and the image according to the analysis of the information of the clip area.

Another aspect of the present disclosure is to provide an apparatus and a method capable of clipping and processing data relating to information together with the information by analyzing the information of the clip area according to an application which is executed when the information is clipped.

In accordance with an aspect of the present disclosure, a method for processing information in a portable terminal is provided. The method includes displaying a content, displaying a clip area on the content when detecting a clip touch interaction, correcting the clip area by analyzing a pattern and/or information of the clip area, and storing information of corrected clip area in a clipboard.

In accordance with another aspect of the present disclosure, a method for processing information in a portable terminal is provided. The method includes displaying a content, displaying a clip area on the content when detecting a clip touch interaction, analyzing an execution application, and clipping information of the clip area by adding information of currently executed application to information included in the clip area to be included in the clip area, and storing the information of the clip area in a clipboard.

In accordance with another aspect of the present disclosure, a portable terminal is provided. The portable terminal includes a display unit configured to display a content, a touch panel configured to detect a clip touch interaction, a controller configured to display a clip area in a location corresponding to the displayed content when detecting the clip touch interaction, and to correct the clip area by analyzing a pattern and/or information of the clip area, and a storage unit configured to store information of corrected clip area in a clipboard.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A and 4B illustrate a procedure of correcting a clip area when information is a text and an image according to an embodiment of the present disclosure;

FIG. 5 illustrates a procedure of correcting a clip area when information is a text and an image according to an embodiment of the present disclosure;

FIGS. 9A, 9B, 9C, 9D, 9E, and 9F illustrate a procedure of adding and clipping data according to an application that is executed when clipping information according to an embodiment of the present disclosure.

Throughout the drawings, it should be noted that like reference numbers are used to depict the same or similar elements, features, and structures.

DETAILED DESCRIPTION

Figure 1:
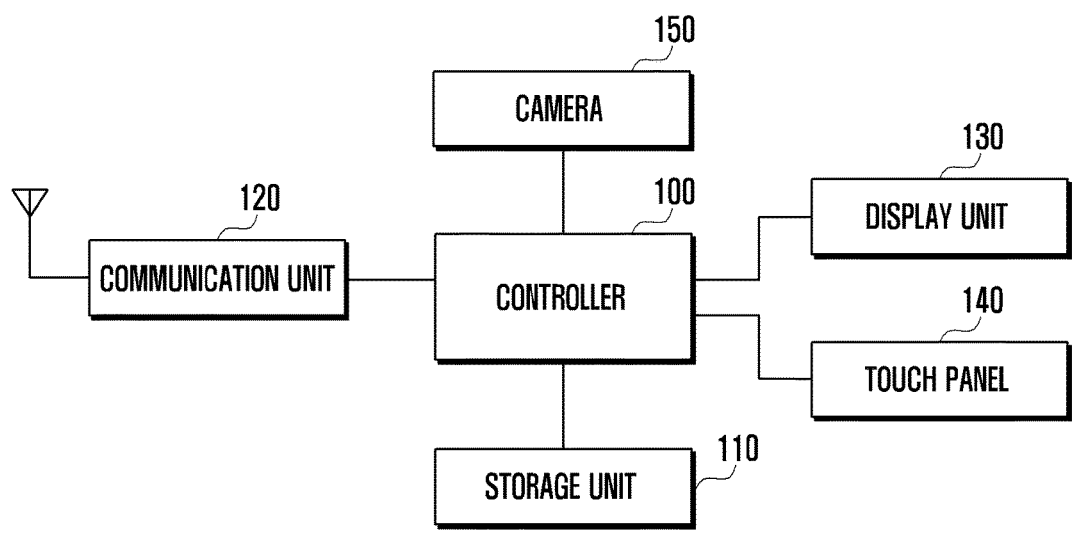
FIG. 1 is a block diagram illustrating a configuration of a portable terminal which clips and processes information according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An information processing method according to various embodiments of the present disclosure in a portable terminal may clip information according to information attribute of a clip area and a pattern of a preset clip area. When clipping and processing displayed information in the portable terminal, a method for clipping information according to various embodiments of the present disclosure may correct the clip area in a pattern of a minute and a standardized figure according to the pattern of the clip area set by drawing, and may clip the information having a curve according to a pattern of an image or a pattern of a paragraph of a text constituting the image by analyzing the information of the clip area.

In addition, when clipping the information in the portable terminal, as a result of analyzing the information in the clip area, if the text/image is overlapped with the boundary of the clip area, the clip area may be corrected to include the text/image of the boundary. Further, if the information includes the text and the image, the text and the image may be separated according to each attribute of the information to clip. In addition, when clipping the information in the portable terminal, the portable terminal may clip and process a data related to information of the clip area together with the information according to an executed application.

In the description below, the term "clip area" refers to an area set by drawing in order to clip information, and "correction clip area" refers to an area correcting the clip area by analyzing the pattern of the clip area and/or the information in the clip area. In addition, the correction area may be set by drawing, and the drawing may be executed by a finger or a pen, or the like. In an embodiment of the present disclosure, it is assumed that the drawing is a pen drawing.

FIG. 1 is a block diagram illustrating a configuration of a portable terminal which clips and processes information according to an embodiment of the present disclosure.

Referring to FIG. 1, a communication unit 120 may perform a wireless communication function with a base station or an internet server 120. Here, the communication unit 120 may be configured with a transmission unit for up-converting a frequency of a transmitted signal and amplifying a power, and a reception unit for low-noise amplifying a received signal and down-converting a frequency. Further, the communication unit 120 may include a modulation unit and a demodulation unit. Here, the modulation unit modulates a transmission signal to transmit to the transmission unit, and the demodulation unit demodulates a signal received through the reception unit. In this case, the modulation and demodulation unit may be Long Term Evolution (LTE), Wideband Code Division Multiple Access (WCDMA), Global System for Mobile Communication (GSM), or the like, and WIFI, Worldwide Interoperability for Microwave Access (WIMAX), or the like, and may be a Near Field Communication (NFC), Bluetooth, or the like. In an embodiment of the present disclosure, it is assumed that the communication unit 170 may include a communication unit, such as LTE, WIFI, Bluetooth, NFC, or the like.

A controller 100 may control an overall operation of the portable terminal. In addition, the controller 100 may display information at a time of executing an application, correct the clip area by analyzing the pattern of a clip area set by the user and/or the information within the clip area, and clip the information within the corrected clip area to store and process. Further, the controller 100 may add additional information according to the application which is executed when clipping the information within the clip area to generate and process the clipping information.

A storage unit 110 may include a program memory that stores an operation program of the portable terminal and a program according to an embodiment of the present disclosure, and a data memory that stores processed information. In addition, the storage unit 110 may include a clipboard area that temporarily stores the clip information processed by the controller 100.

A display unit 130 may display a photographed image under control of the controller 100. The display unit 130 may be a Liquid Crystal Display (LCD) or an Organic Light Emitting Diode (OLED). A touch panel 140 may generate instruction and data for controlling the operation of the portable terminal, and may generate a clip area selection signal according to various embodiments of the present disclosure. Here, the touch panel 140 may include a first touch panel of a capacitive type or a resistive type that can detect a user's touch input (hereinafter, it is assumed that the user's touch input is a finger touch) and a second touch panel of an EMR sensor pad that can detect a pen drawing. In addition, when the pen touch input is implemented with the capacitive type, the finger touch input and the pen touch input may be implemented with one touch panel. Here, the display unit 130 and the touch panel 140 may be configured with an integrated touch screen.

The camera 150 may photograph a still image and a video under the control of the controller 100. In the portable terminal having such a configuration, the user may set an area for clipping the information displayed on the display unit 130. At this time, the selection of the clip area may be executed by using the pen. For example, when the user draws the area for clipping with the pen while pressing a button of the pen, the controller 100 may trace a trajectory of the pen drawn through the touch panel 140 to display the clip area on the display unit 130.

Thereafter, the controller 100 may analyze the information of the clip area to determine a target of the clip. Here, the clip target may be determined based on a case of clipping an image, a case of clipping a text, a case of clipping information including image and text, or a case of clipping information in a specific application.

Further, the controller 100 may correct the clip area with the determination on the clip target. Here, the correction of the clip area may be performed according to the pattern of the clip area and/or the pattern of the information within the clip area. For example, the controller 100 may analyze the vertex of the clip area to correct as a figure, or may correct the clip area according to a pattern of information object (i.e., an image/text object). At this time, when correcting the clip area according to the pattern of information object, the controller 100 may correct the clip area according to the pattern of image when the information is an image, and may correct the clip area according to the pattern of paragraph within the clip area when the information is a text.

Thereafter, when correcting the clip area, the controller 100 may correct the clip area to include the information (i.e., an image and/or a text) overlapped with the boundary of a clip area set by the drawing (e.g., a pen drawing). In addition, when the information in the clip area includes an image and a text, the controller 100 may set each clip area by separating the image from the text according to each attribute.

Further, when setting the information within the clip area, the controller 100 may also clip and display the information including the data in the executed application. For example, when the clip area is set, the controller 100 may analyze the currently executed application, and may also display the information (i.e., information possessed by the executed application or added information) of the application corresponding to the information of the clip area on the clip area.

In addition, the controller 100 may display the information of the clip area which is set as described above on the display unit 130, temporarily store in the clipboard, and may process the stored clipping information in the application set by the user.

Figure 2:
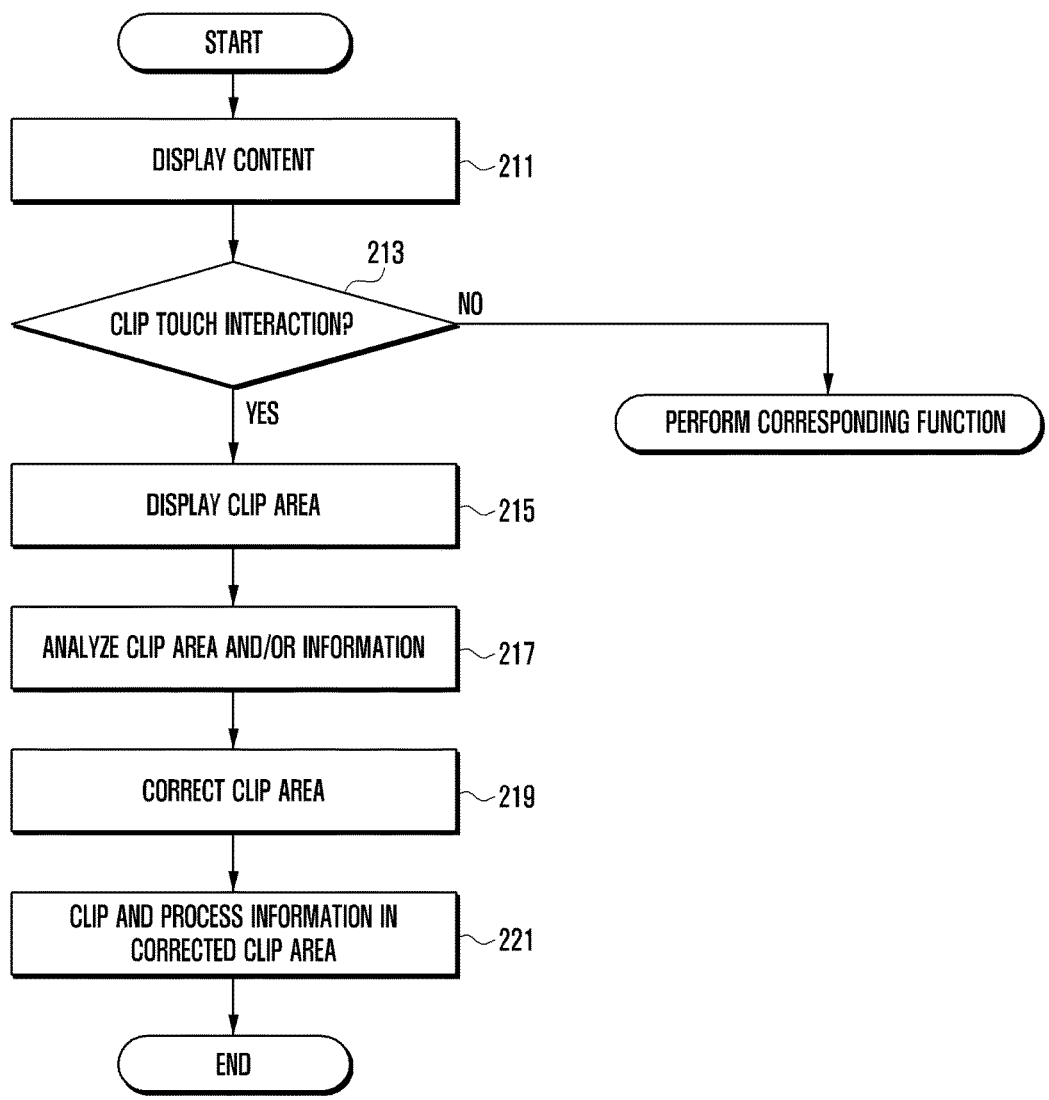
FIG. 2 is a flowchart illustrating a procedure of correcting a clip area and processing clipping information according to an embodiment of the present disclosure.

FIG. 2 is a flowchart illustrating a procedure of correcting a clip area and processing clipping information according to an embodiment of the present disclosure.

Referring to FIG. 2, the controller 100 may display the information of the currently executed application on the display unit 130 at operation 211. At this time, when a user generates a clip touch interaction on a displayed screen, the controller 100 may detect this through the touch panel 140 at operation 213, and display the clip area set by the user on the display unit 130 at operation 215.

Here, the user may set the clip area by using the pen. For example, when the user executes the pen drawing while pressing the button of the pen, the controller 100 may detect this through the touch panel 140 as a clip touch interaction, and display the area drawn by the pen as a clip area on the display unit 130.

Thereafter, the controller 100 may analyze the pattern of the clip area and/or the information in the clip area at operation 217, and may correct the clip area according to the analyzed result to display on the display unit 130 at operation 219. The controller 100 may examine whether the pattern of the clip area which is set by the user has a vertex, and may correct the clip area by a figure corresponding to the number of vertices. Further, the controller 100 may analyze the pattern of the information within the clip area to examine the curvature pattern (i.e., a pattern of an image or a pattern of a paragraph in a text, and the like) that the information has, and may correct the clip area according to the curvature pattern of the information. Further, the controller 100 may analyze the information within the corrected clip area and may correct the clip area based on the attribute of the text or the image.

After correcting the clip area as described above, at operation 221, the controller 100 may clip the information in the corrected clip area to store in the clipboard, and process the information stored in the clipboard according to the function which is set by the user.

Figure 3:
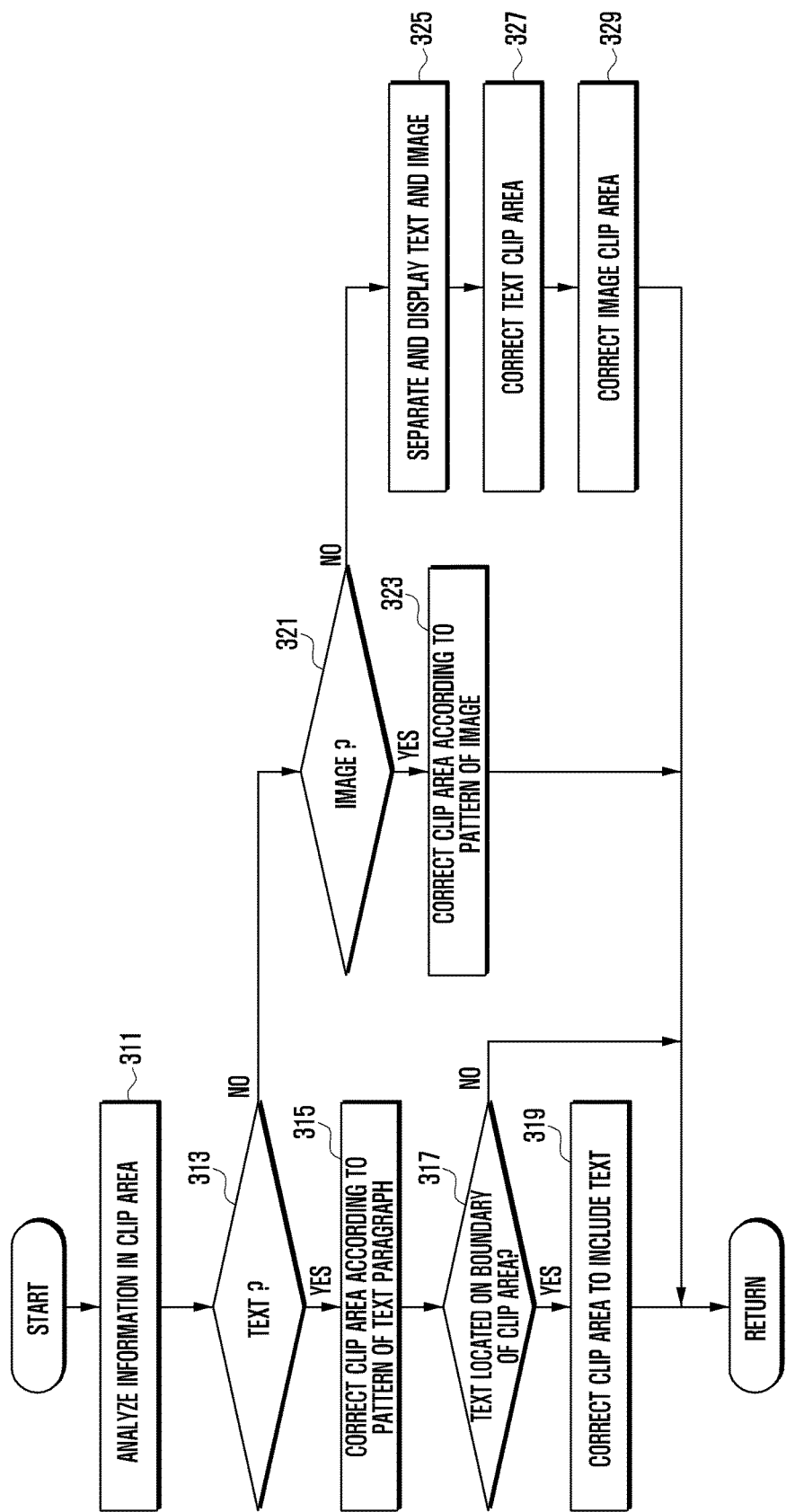
FIG. 3 is a flowchart illustrating a procedure of correcting a clip area according to an embodiment of the present disclosure.

FIG. 3 is a flowchart illustrating a procedure of correcting a clip area according to an embodiment of the present disclosure. FIGS. 4A and 4B illustrate a procedure of correcting a clip area when information is a text and an image according to an embodiment of the present disclosure. FIG. 5 illustrates a procedure of correcting a clip area when information is a text and an image according to an embodiment of the present disclosure.

Referring to FIGS. 3, 4A, 4B, and 5, when the clip area is set by the pen drawing, the controller 100 may examine the information in the clip area at operation 311. At this time, when the information in the clip area is a text, the controller 100 may detect this at operation 313, analyze the pattern of the paragraph of text in the clip area and, correct the clip area according to the curvature of the paragraph based on a result of the analysis at operation 315. In addition, at operation 317, the controller 100 may analyze the boundary of the clip area. If the text is located on the boundary of the clip area, the controller 100 may correct the clip area to make the text located on the boundary of the clip area to be included in the clip area at operation 319. Here, the operation of 317 and the operation 319 may be performed before correcting the clip area (i.e., after operation 313 before operation 315 in FIG. 3) according to the paragraph pattern of text.

As described above, when the clip area is set by the pen drawing, the controller 100 may analyze the information in the clip area, and display a clip area 413 as illustrated in a screen 410 of FIG. 4A when the information in the clip area is a text. When the text is included in the boundary of the clip area 413 as illustrated in reference numeral 415, the controller 100 may detect this at operation 317, and correct the clip area to make the text located in the boundary of the clip area to be included in the clip area as illustrated in reference numeral 425 at operation 319. For example, when the text is located on the boundary of the clip area, the controller 100 may set a line in an upper portion as illustrated in reference numeral 433 and set a line in a lower portion as illustrated in reference numeral 435 based on the longest character of characters of the text as illustrated in reference numeral 430 of FIG. 4A. In addition, the controller 100 may clip the text located between boundary line 433 and 435 and make the text to be included in the clip area.

Further, when it is determined that the information in the clip area 413 is a text as illustrated in the screen 410, the controller 100 may analyze the pattern of the paragraph located in the clip area 413, and may correct the clip area with an uneven pattern according to the pattern of the paragraph as illustrated in reference numeral 423 of the screen 420 at operation 315. Therefore, the controller 100 may clip the texts that have the uneven pattern according to the pattern of the paragraph of the texts existing in the clip area 413 and set the corrected clip area as illustrated in reference numeral 423, and make the texts located on the boundary of the clip area 413 to be included in the corrected clip area as illustrated in reference numeral 425. Further, if the information in the clip area is an image, the controller 100 may detect this at operation 321, and correct the clip area to have a curvature according to the pattern of image object in the clip area at operation 323. Further, if the image is located on the boundary of the clip area, the controller 100 may correct the clip area to make the image located on the boundary of the clip area to be included in the clip area.

For example, if the information in the clip area set by the pen drawing is the image, the controller 100 may display the clip area 443 including the image as illustrated in the screen 440 of FIG. 4B. After analyzing the curvature of the image located within the clip area 443, at operation 323, the controller 100 may correct the clip area as illustrated in reference numeral 453 of the screen 450 according to the curvature of the image. Accordingly, the controller 100 may clip the image according to the curvature of the image existing in the clip area 443 to set the corrected clip area 453. Although not shown, when the image is located on the boundary of the clip area 443, the controller 100 may set the corrected clip area 453 to include the image located on the boundary of the clip area 443.

Further, if the information in the clip area is information that includes an image and a text, the controller 100 may detect this at operation 321, set a new clip area by separating the text from the image in the clip area at operation 325, and may set clip areas of text and image corrected according to the pattern of text and image at operation 327 and operation 329.

For example, if the information in the clip area 513 set by the pen drawing is information that includes an image and a text as illustrated in a screen 510 of FIG. 5, the controller 100 may display the clip area by separating the clip area 520 of the text from the clip area 523 of the image as illustrated in a screen 520 of FIG. 5. Thereafter, at operation 327, the controller 100 may set a corrected clip area 535 by correcting the clip area 525 of the text according to the paragraph pattern of the text, and set a corrected clip area 533 by correcting the clip area 523 of the image according the curvature pattern of the image. At this time, when correcting the clip area of the image and/or text, if the image and/or text is located on the boundary of the clip area, the controller 100 may correct the clip area so that the corrected image clip area 533 and/or corrected text clip area 535 may include the image and/or text located on the boundary at operation 327 and/or operation 329.

Figure 6:
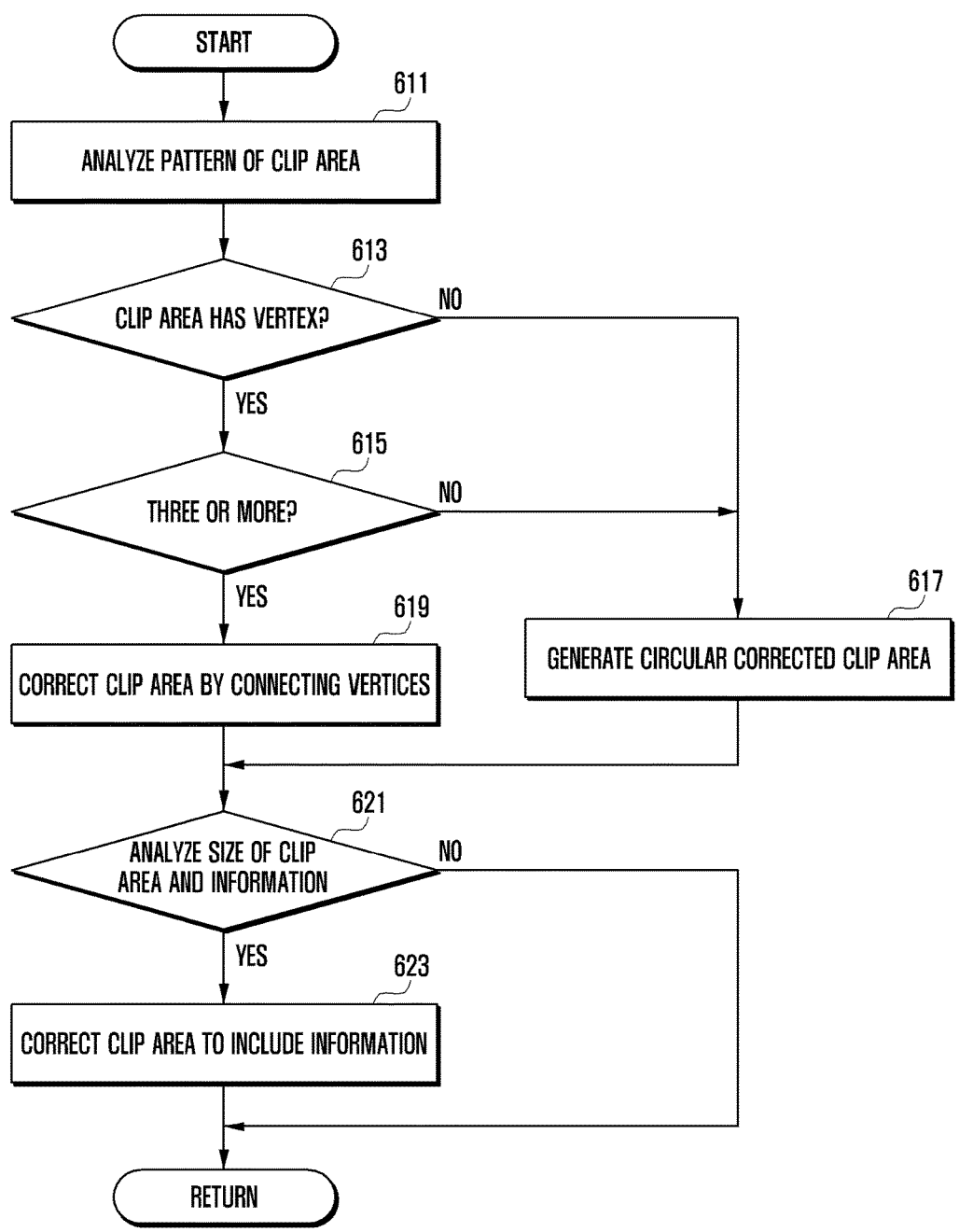
FIG. 6 is a flowchart illustrating a procedure of correcting a clip area according to an embodiment of the present disclosure.
Figure 7A:
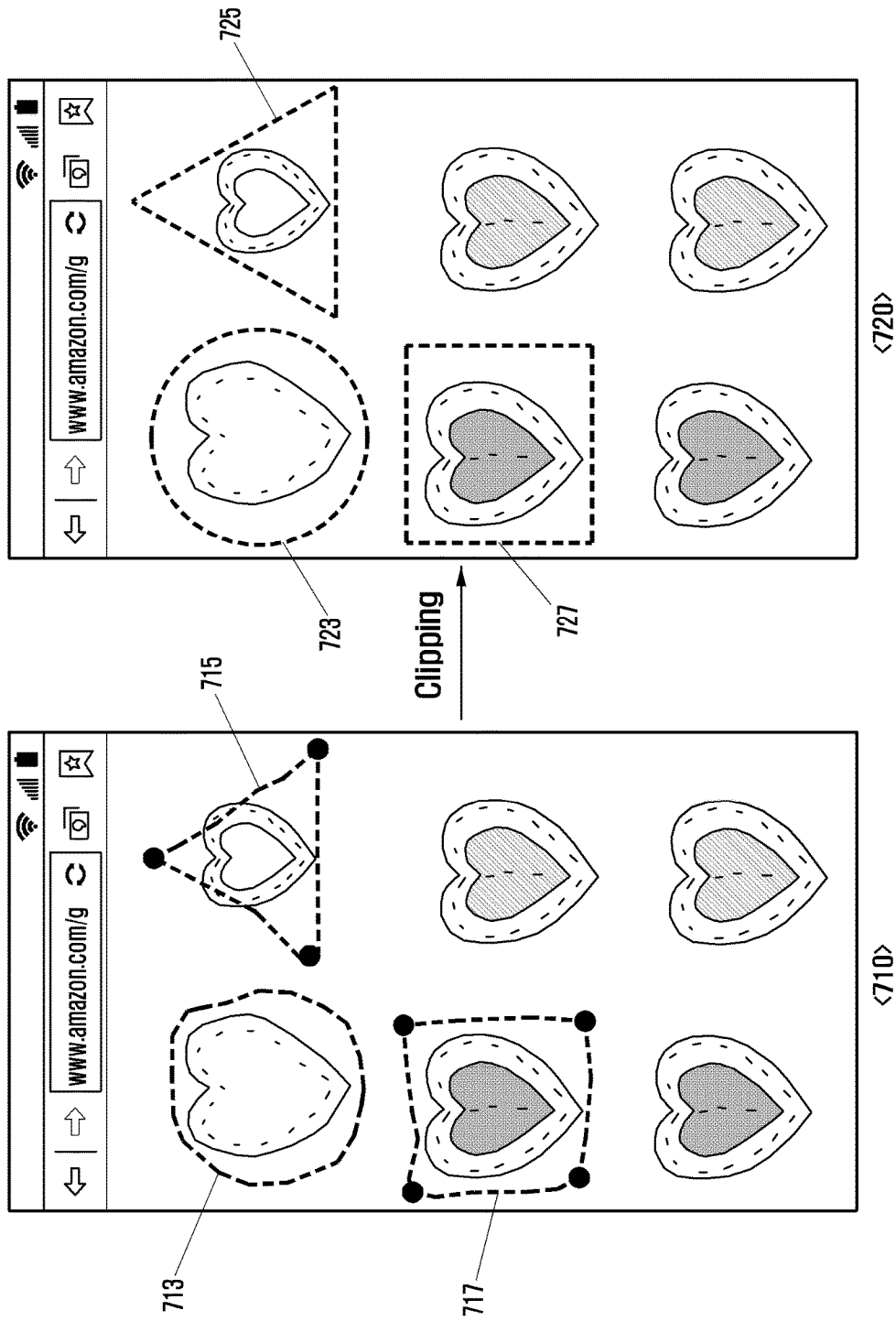
FIGS. 7A and 7B illustrate a procedure of setting and correcting a clip area according to an embodiment of the present disclosure.
Figure 7B:
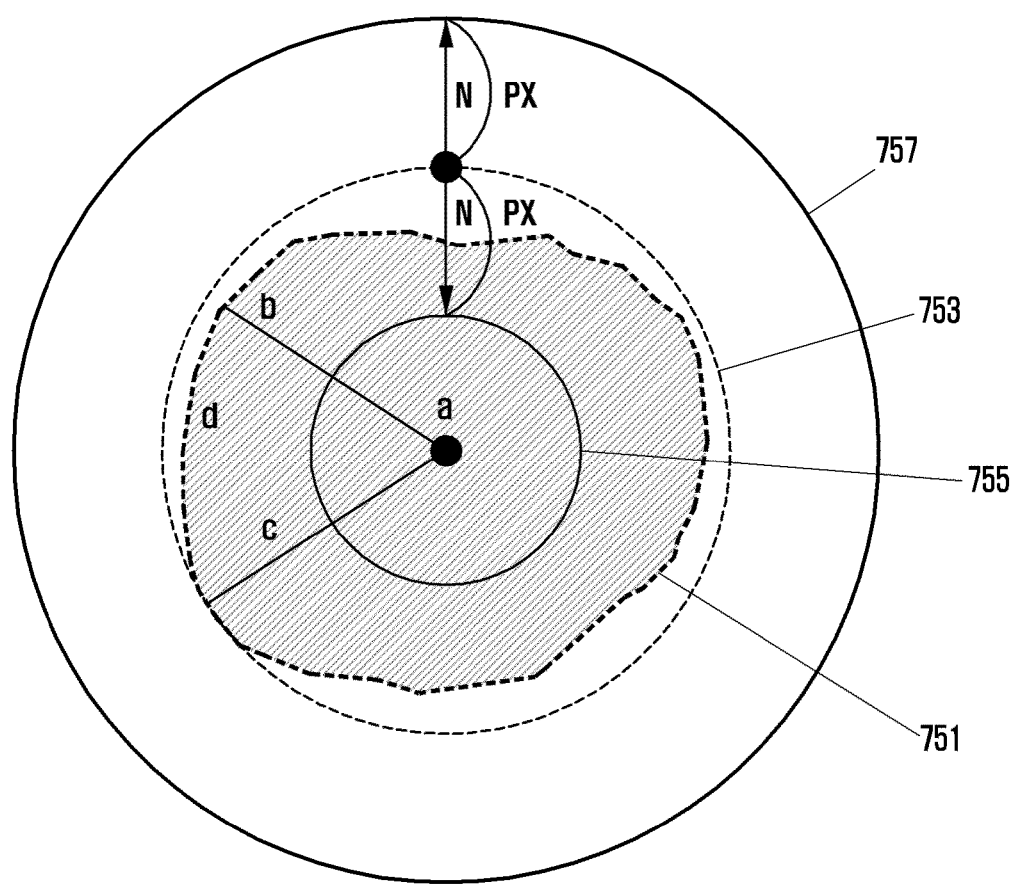

FIG. 6 is a flowchart illustrating a procedure of correcting a clip area according to an embodiment of the present disclosure. FIGS. 7A and 7B illustrate a procedure of setting and correcting a clip area according to an embodiment of the present disclosure.

Referring to FIGS. 6, 7A, and 7B, when the clip area is set, the controller 100 may analyze the pattern (or type) of the clip area at operation 611. The clip area may be set by the pen drawing of a user, and the pattern may be a circular or polygonal shape. The controller 100 may analyze the presence and the number of vertices of the clip area to determine the pattern of the clip area. In this case, the controller 100 may analyze the variation of the angle of the clip area in a curved position of the clip area and may determine as a vertex in a case of having a certain angle or less. Here, if the angle is about 90 degrees (e.g., 120 degrees or less), it may be determined as a vertex. Here, if the clip area does not have a vertex, the controller 100 may detect this at operation 613, and may generate a circular corrected clip area at operation 617. In addition, when the clip area has vertices less than three, the controller 100 may detect this at operation 615, and may generate the circular corrected clip area at operation 617.

At this time, the information for clipping may be located on the boundary of the clip area set by the user. Additionally, the clip area set by the user may be set in a range greater than the information for clipping, so that a correction may be needed. The controller 100 may analyze the size of the clip area and the information at operation 621, and may correct the clip area to include information when the information is overlapped with the boundary of the clip area or when the size of the information is relatively smaller than the size of the clip area at operation 623.

FIG. 7B is a diagram illustrating a method for setting a corrected clip area according to a clip area set by a user and a size of information which is a clip target. FIG. 7B illustrates an example of corrected clip area which has a circular shape according to an embodiment of the present disclosure.

Referring to FIG. 7B, reference numeral 751 may be the clip area which is set by the pen drawing of a user. When the clip area 751 is detected, the controller 100 may detect that there is no vertex at operation 613, and may set the corrected circular clip area as illustrated in reference numeral 753 at operation 617. In this case, the corrected clip area 753 may be set as a circle having a radius c which is the longest based on a comparison of distance from a center point of information for clipping to a clipped boundary line d. At this time, the boundary of the corrected clip area 753 may be located at the information for clip, or the information for clipping may have a size much smaller than the corrected clip area 753.

In order to address this issue, as shown in FIG. 7B, the controller 100 may set a range of +/−n pixel (px) based on circumscription of the corrected clip area 753. In this case, in the case of +n px, the corrected clip area may be set as illustrated in reference numeral 757, whereas, in the case of −n px, the corrected clip area may be set as illustrated in reference numeral 755. Accordingly, when the clip area 751 is set by the user, the controller 100 may set the corrected clip area as illustrated in reference numeral 753 at operation 617, and may analyze the size of the corrected clip area 753 and the information.

In this case, when the information is located on the boundary of the corrected clip area 753, at operation 623, the controller 100 may set the extended corrected clip area as illustrated in reference numeral 753, determine whether the information is located within the corrected clip area 755 when the size of the information is smaller than the corrected clip area 753, and set the corrected clip area as illustrated in reference numeral 755 when the information is located within the corrected clip area 755 at operation 623. However, when the information is located within the corrected clip area 753 with an appropriate size, the controller 100 may detect this at operation 621, and maintain the corrected clip area 753 set at operation 617.

In addition, when the clip area has three or more vertices at operation 615, the controller 100 may detect this at operation 615, and set the corrected clip area by connecting the vertices at operation 619. Thereafter, the controller 100 may analyze the size of the corrected clip area and the information to reset the corrected clip area by the method described in FIG. 7 when the information is overlapped with the corrected clip area or when the size of the information is relatively smaller than the size of the corrected clip area.

Referring to FIG. 7A, when the clip area is set as illustrated in reference numeral 713 in a screen 710 of FIG. 7A, the controller 100 may detect that there is no vertex at operation 613, and may set a circular corrected clip area as illustrated in reference numeral 723 at operation 617. At this time, the controller 100 may recognize that the information for clipping may be clipped with an appropriate size by the corrected clip area 723, and terminate the correction operation of the clip area. In addition, when the clip area is set as illustrated in reference numeral 717, the controller 100 may detect that there are four vertices at operation 615, and may set a rectangular corrected clip area as illustrated in reference numeral 727 at operation 619. At this time, the controller 100 may recognize that the information for clipping may be clipped with an appropriate size by the corrected clip area 727, and terminate the correction operation of the clip area.

In addition, when the clip area is set as illustrated in reference numeral 715, the controller 100 may detect that there are three vertices at operation 615, and may set a triangular corrected clip area at operation 619. However, it can be known that the boundary of the clip area is overlapped with the information for clip. In this case, the controller 100 may recognize that the information for clipping may not be clipped with an appropriate size by the corrected clip area at operation 621, and set the corrected clip area as illustrated in reference numeral 725 in a screen 720 of FIG. 7A extending the clip area at operation 623. Further, when clipping the information in the portable terminal, besides the information in the clip area, a data according to the executed application may be added and clipped.

Figure 8:
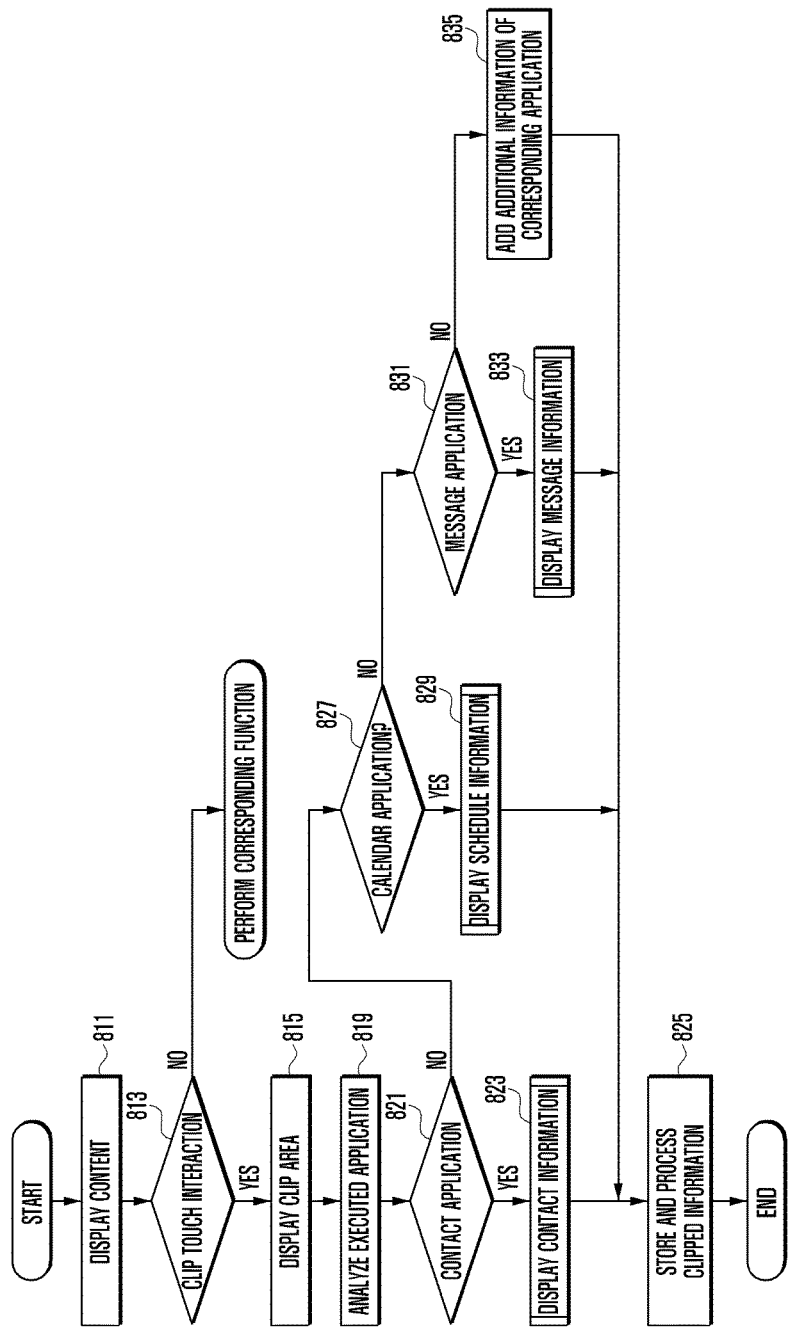
FIG. 8 is a flowchart illustrating a procedure of clipping information in a portable terminal according to an embodiment of the present disclosure.

FIG. 8 is a flowchart illustrating a procedure of clipping information according to an embodiment of the present disclosure. FIGS. 9A, 9B, 9C, 9D, 9E, and 9F illustrate a procedure of adding and clipping data according to an application that is executed when clipping information according to an embodiment of the present disclosure.

Referring to FIGS. 8, 9A, 9B, 9C, 9D, 9E, and 9F, the controller 100 may display the information of the currently executed application on the display unit 130 at operation 811. At this time, when the user generates a clip touch interaction on the displayed screen, the controller 100 may detect this through the touch panel 140 at operation 813, and display the clip area set by the user on the display unit 130 at operation 815. Here, the clip area may be set by the pen drawing of a user. For example, when the user executes the pen drawing while pressing the button of the pen, the controller 140 may detect this as a clip touch interaction through the touch panel 140, and may display the area drawn by the pen on the display unit 130 as a clip area. Thereafter, the controller may analyze the currently executed application at operation 819.

In this case, when the executed application is a contact application, the controller 100 may detect this at operation 821, and add the data of a corresponding subscriber stored in a contact list to subscriber information of the currently displayed clip area and display. When displaying a screen 910 of FIG. 9A at operation 811, if a user sets contact information of a specific subscriber as a clip area as illustrated in reference numeral 913 of screen 910, the controller 100 may detect this at operation 821 and display the contact information together with a phone number (mobile and/or home) of corresponding subscriber stored in the contact list as illustrated in reference numeral 917 of screen 915 at operation 823.

Figure 9A:
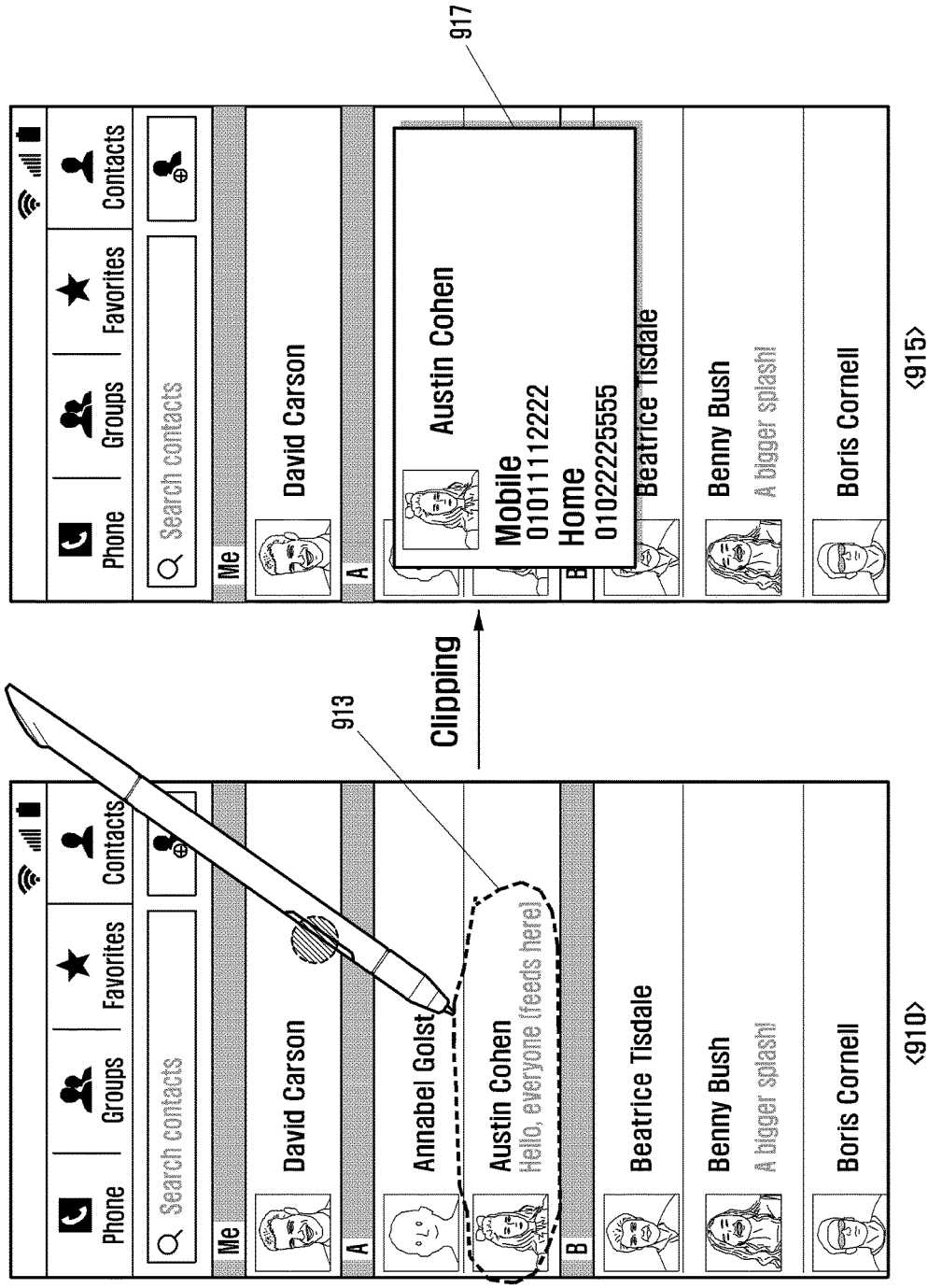
Figure 9D:
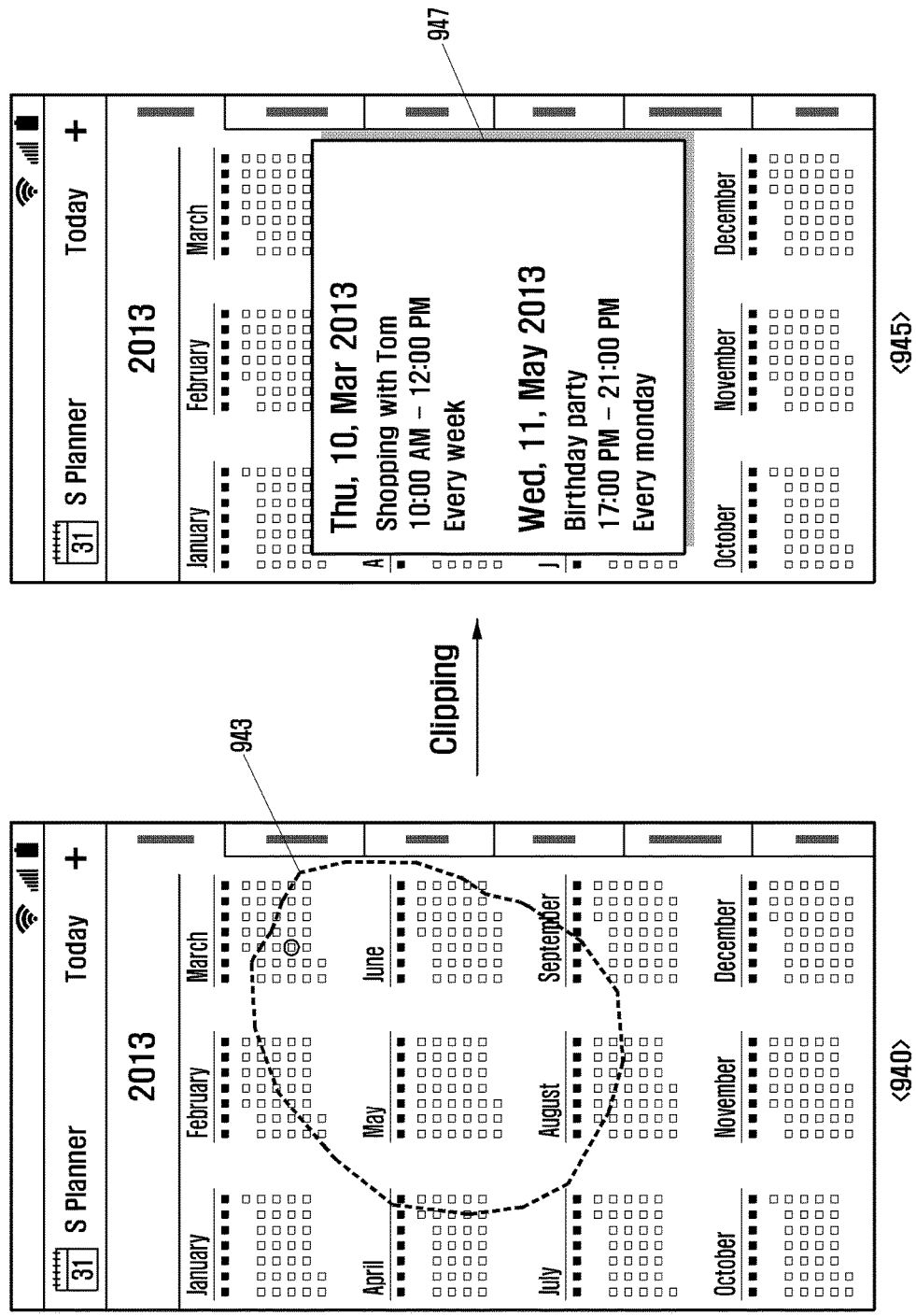

Generally, a subscriber's photo, a name, a phone number, an e-mail, and the like, may be registered in the contact list. In this case, as shown in FIG. 9A, when the photo and/or name of subscriber is set as a clip area in the contact list, the controller 100 may include additional information (i.e., phone number, email address, and the like) of a corresponding subscriber in addition to the photo and/or name of the subscriber included in the clip area and display on the clip area. In addition, the subscriber information of the contact list may be configured with a photo, a text, and the like. In this case, the controller 100 may separate the image from the text to clip. For example, when the clip area is set as illustrated in reference numeral 923 in a screen 920 of FIG. 9B, the controller 100 may separate the image from the text in the contact list as illustrated in reference numerals 927 and 929 of a screen 925 to clip and display. Thereafter, the controller 100 may store the clipped subscriber information (e.g., information in a case of adding information registered in a contact list, or information in a case of separating image from a text based on each attribute to clip besides information of the clip area) in the clipboard, and process the stored information at operation 825.

Further, when the executed application is a calendar application, the controller 100 may detect this at operation 827, and add a registered schedule to time information (e.g., year, month, day, time, and the like) of the clip area and display at operation 829. For example, when the user sets a specific date as a clip area as illustrated in reference numeral 933 while displaying a month view as shown in a screen 930 of FIG. 9C at operation 811, the controller 100 may detect this at operation 827, and may display together with schedule information registered in a corresponding date as illustrated in reference numeral 937 of a screen 935 at operation 829. In addition, when the user sets the clip area as illustrated in reference numeral 943 while displaying a year view as shown in a screen 940 of FIG. 9D at operation 811, the controller 100 may detect this at operation 827, and may also set schedule information registered in a date corresponding to the clip area as a clip area as illustrated in reference numeral 947 of a screen 945 at operation 829.

In addition, when the executed application is a message application, the controller 100 may detect this at operation 831, and may add the data of a corresponding subscriber stored in the contact list to the currently displayed message of the clip area and display. For example, when displaying a screen 950 of FIG. 9E at operation 811, if the user sets a specific message as a clip area as illustrated in reference numeral 953, the controller 100 may detect this at operation 831, and may display the message together with the subscriber's phone number (of mobile and/or home) stored in the contact list as illustrated in reference numeral 957 of a screen 955 at operation 833. Further, a specific message may be clipped. For example, when the clip area is set as illustrated in reference numeral 963 in a screen 960 of FIG. 9F, the controller 100 may display clip and display the message of the clip area set as illustrated in reference numeral 967 of a screen 965.

In addition, when the clip area is set in other application besides the above-described applications, the controller 100 may add the additional information of corresponding application to the information of the clip area set by a user and clip at operation 835. Thereafter, after performing operation 829, operation 883 or operation 835, the controller 100 may store the clipped information (information of the clip area set by user, and information added from corresponding application) in the clipboard, and process the stored information at operation 825.

At this time, the clip area may be corrected as described in FIG. 3 or FIG. 6. For example, after adding the additional information of corresponding application to the information of the clip area to be included in the clip area by performing operation 823, operation 829, operation 833, or operation 835, the controller 100 may perform operation 825 after correcting the clip area by analyzing the pattern of the clip area and/or the information of the clip area while performing the procedure of FIG. 3 or FIG. 8. In this case, as described above, the controller 100 may analyze the pattern of the clip area and/or the information within the clip area, and correct the clip area based on the result of analysis and display on the display unit 130.

At this time, the controller 100 may correct the clip area as a corresponding figure according to whether the pattern of the clip area set by a user has a vertex or the number of vertices while performing the procedure of FIG. 8. Further, the controller 100 may examine the pattern of curvature (i.e., a pattern of an image, a paragraph pattern of a text, and the like) that the information has by analyzing the pattern of the information within the clip area, and correct the clip area based on the pattern of curvature of the information. Further, the controller 100 may correct the clip area based on the attribute of the text or the image by analyzing the information within the corrected clip area.

As described above, the method for processing information of the portable terminal according to various embodiments of the present disclosure may perform clipping by correcting the clip area and/or the information of the clip area according to the pattern of the clip area, the information of the clip area and/or the executed application, with respect to the information set by the user. In this case, the user may select a target to be clipped by a pen and a pen button pressing, and the controller 100 may display the selected area as a clip area.

At this time, the controller 100 may determine the pattern of the clip area and/or the information attribute of the clip area. When the image is clipped, the controller 100 may determine the number of recognized vertices or the pattern of the image object. When the text is clipped, the controller 100 may determine the paragraph pattern of the text in the clip area and determine whether the text is located on the boundary of the pen drawing. When both of text and image exist, the attribute of the image and the text included in the clip area may be determined respectively. In addition, the clip area is set in a specific application, the controller 100 may determine the type of the clipped application and the storage of the data related to the clip area to correct the information of the clip area.

In addition, the controller 100 may perform a processing according to a clipped target. For example, in a case of an image, the controller 100 may correct the clip area as a figure according to the number of vertices of pen drawing. In addition, in a case of a text, the controller 100 may correct the clip area by determining the paragraph pattern (indentation, reverse indentation, final position of sentence, or the like) of the text within the clip area, the pattern (e.g., a straight line, a curved line, and the like) of clipped line, and the like. Further, when the text and/or image is clipped, the controller 100 may correct the clip area by determining the text and/or image included in the boundary of the clip area. In addition, when the text and/or image is included, the controller 100 may set the respective independent clip area according to the attribute of the text and the image.

In addition, when the clip area is selected in a specific application, the controller 100 may perform clipping by adding the data stored in the information of the clip area when the data related to the clip area is stored. For example, in a case of a contact application, information of a phone number, an email address, an event, a birthdate, and the like, may be added to the information of the contact area to clip, in a case of a calendar application, schedule information (i.e., schedule date, contents, time, map, image, and the like) relating to information (i.e., information of year, month, day, hours, and the like) of the clip area may be added to clip, and, in a case of a message application, subscriber's information (i.e., a phone number of sender, a phone number of receiver, time and date of message transmission, and the like, of corresponding message) relating to a message of the clip area may be added to clip.

As described above, the present disclosure may correct an area for clipping information in a pattern of a minute and a standardized figure according to a clip pattern (e.g., a pen drawing) when clipping the information in a portable terminal. In addition, the present disclosure may clip information according to a curved shape of information of a clip area by analyzing the information of the clip area when clipping the information in a portable terminal. In addition, the present disclosure may correct a clip area to include a boundary text/image when the text/image is overlapped with a boundary of the clip area. In addition, the present disclosure may clip information by separating a text and an image according to attribute of information when the clip area includes the text and the image. In addition, the present disclosure may clip and process data related to information together with information by analyzing the information of the clip area according to an application that is executed when the information is clipped.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing information in a portable terminal, the method comprising:
    displaying a content;
    receiving a user input on the displayed content;
    setting a clip area on the displayed content according to a pattern of the received user input;
    analyzing the pattern of the user input and a type of at least one content in the clip area;
    automatically correcting the pattern of the received user input to a pattern corresponding to a shape of an image in the clip area, when the type of at least one content is the image;
    automatically correcting the pattern of the received user input to a pattern corresponding to a shape of paragraph of the text in the clip area, when the type of at least one content is the text;
    correcting the clip area according to the corrected pattern of the received user input; and
    storing information of corrected clip area in a clipboard.

2. The method of claim 1,
    wherein the correcting of the pattern of the clip area comprises correcting the clip area to include the information of the clip area when the information of the clip area is located on a boundary of the clip area, and
    wherein the information of the clip area comprises at least one of an image and a text.

3. The method of claim 1, wherein the correcting of the pattern of the clip area comprises:
    generating a clip area separating the text from the image when the information within the clip area comprises the image and the text;
    correcting the clip area of the separated image according to the pattern corresponding to the shape of the image; and
    correcting the clip area of the separated text according to the pattern corresponding to the shape of the paragraph.

4. The method of claim 2, wherein the correcting of the pattern of the clip area comprises:
    examining a number of vertices of the clip area;
    correcting the clip area according to a circle when the number of vertices is two or less; and
    correcting the clip area according to a polygon corresponding to the number of vertices when the number of vertices is three or more.

5. The method of claim 4, wherein the correcting of the pattern of the clip area according to a circle comprises setting a corrected circular clip area having a radius which has a length ranging from a center of the information of the clip area within the clip area to farthest information of the clip area.

6. The method of claim 5, wherein the correcting of the pattern of the clip area according to a circle comprises:
    correcting the clip area according to a circular clip area having a radius larger than the corrected circular clip area as much as a set number of pixel when the information of the clip area is located on the boundary of the corrected clip area; and
    correcting the clip area according to a circular clip area having a radius smaller than the corrected circular clip area as much as a set number of pixel when the information of the clip area is smaller than the corrected clip area.

7. A method for processing information in a portable terminal, the method comprising:
    displaying a content;
    receiving a user input on the displayed content;
    setting a clip area on the displayed content according to a pattern of the received user input;
    determining the pattern of the user input and type of at least one content in the clip area;
    searching an additional information relating to the at least one content included in the clip area by analyzing an executed application corresponding to the clip area;
    automatically correcting, by at least one processor of the portable terminal, the at least one content of the clip board by adding the searched additional information to the clip area;
    automatically correcting the pattern of the received user input to a pattern corresponding to a shape of at least one content in the clip area and the type of at least one content in the clip area;
    correcting the clip area including the added searched additional information according to the corrected pattern of the received user input; and
    storing the corrected information of the clip area in a clipboard.

8. The method of claim 7, wherein the correcting of the at least one content of the clip area comprises clipping information of the clip area by adding a data of subscriber registered in a contact list to subscriber information of the clip area when the execution application is a contact application.

9. The method of claim 7, wherein the correcting of the at least one content of the clip area comprises clipping information of the clip area by separating a text from an image from the subscriber information of the clip area to generate clip areas respectively when the execution application is a contact application.

10. The method of claim 7, wherein the correcting of the at least one content of the clip area comprises clipping information of the clip area by adding corresponding schedule information to the information of the clip area when the execution application is a calendar application.

11. The method of claim 10, wherein the correcting of the at least one content of the clip area comprises clipping information of the clip area by adding subscriber information corresponding to a message of the clip area to the message when the execution application is a message application.

12. A portable terminal comprising:
a display unit configured to display a content;
a touch panel configured to receive a user input on the displayed content;
at least one processor configured to:
  cause the display unit to display a clip area on the displayed content set according to a pattern of the received user input,
  analyze the pattern of the user input and a type of at least one content in the clip area,
  automatically correct the pattern of received user input to a pattern corresponding to a shape of an image in the clip area, when the type of at least one content is the image,
  automatically correct the pattern of the received user input to a pattern corresponding to a shape of paragraph of the text in the clip area, when the type of at least one content is the text, and
  correct the clip area according to the corrected pattern of the received user input; and
a storage unit configured to store information of corrected clip area in a clipboard.

13. The terminal of claim 12,
wherein the at least one processor is further configured to correct the clip area to include the information of the clip area when the information of the clip area is located on a boundary of the clip area, and
wherein the information comprises an image and/or a text.

14. The terminal of claim 12, wherein the at least one processor is further configured to correct the clip area by separating the text from the image when the information within the clip area comprises the image and the text.

15. The terminal of claim 13, wherein the at least one processor is further configured to:
examine a number of vertices of the clip area, to correct the clip area according to a circle when the number of vertices is two or less, and
correct the clip area according to a polygon corresponding to the number of vertices when the number of vertices is three or more.

16. The terminal of claim 12, wherein the at least one processor is further configured to:
analyze an execution application when setting the clip area, and
clip information of the clip area by adding information of currently executed application to information included in the clip area to be included in the clip area.

17. The terminal of claim 16, wherein the at least one processor is further configured to clip by adding a data of subscriber registered in a contact list to subscriber information of the clip area when the execution application comprises a contact application.

18. The terminal of claim 16, wherein the at least one processor is further configured to clip by adding registered schedule information to the information of the clip area when the execution application comprises a calendar application.

* * * * *